United States Patent
Hopf et al.

(10) Patent No.: US 12,098,688 B2
(45) Date of Patent: Sep. 24, 2024

(54) METHOD AND DEVICE FOR OPERATING A FUEL INJECTION VALVE WITH THE AID OF MACHINE LEARNING METHODS

(71) Applicant: Robert Bosch GmbH, Stuttgart (DE)

(72) Inventors: Andreas Hopf, Stuttgart (DE); Erik Tonner, Mehring (DE); Frank Kowol, Knittlingen (DE); Jens-Holger Barth, Fellbach (DE); Konrad Groh, Stuttgart (DE); Matthias Woehrle, Bietigheim-Bissingen (DE); Mona Meister, Renningen (DE); Roland Norden, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/001,797

(22) PCT Filed: Sep. 10, 2021

(86) PCT No.: PCT/EP2021/074956
§ 371 (c)(1),
(2) Date: Dec. 14, 2022

(87) PCT Pub. No.: WO2022/053626
PCT Pub. Date: Mar. 17, 2022

(65) Prior Publication Data
US 2023/0340917 A1    Oct. 26, 2023

(30) Foreign Application Priority Data
Sep. 11, 2020   (DE) .................. 10 2020 211 418.8

(51) Int. Cl.
*F02D 41/14* (2006.01)
*F02D 41/24* (2006.01)

(52) U.S. Cl.
CPC .. *F02D 41/1405* (2013.01); *F02D 2041/1433* (2013.01); *F02D 2200/0602* (2013.01)

(58) Field of Classification Search
CPC ............. F02D 41/1405; F02D 41/1433; F02D 2200/0602; F02D 2200/0618; G06N 3/047; G06N 3/08
See application file for complete search history.

(56) References Cited

U.S. PATENT DOCUMENTS 6,088,647 A * 7/2000 Hemberger ........... F02D 41/401
                                                        701/104
11,846,244 B2 * 12/2023 Hopf ........................ G06N 3/08
(Continued)

FOREIGN PATENT DOCUMENTS

| DE | 19740608 C2 | 2/2003 |
| DE | 10344181 A1 | 4/2005 |

(Continued)

OTHER PUBLICATIONS

International Search Report for PCT/EP2021/074956, Issued Jan. 10, 2022.

*Primary Examiner* — Phutthiwat Wongwian
*Assistant Examiner* — Arnold Castro
(74) *Attorney, Agent, or Firm* — NORTON ROSE FULBRIGHT US LLP; Gerard A. Messina

(57) ABSTRACT

A method for operating an injection valve by determining an opening or closing time of the injection valve based on a sensor signal. The method includes: providing an evaluation point time series by sampling a sensor signal of a sensor of the injection valve; using a non-linear data-based first sub-model to obtain a first output vector based on the evaluation point time series, wherein each element of the first output vector is associated with a specific time; using a linear, data-based second sub-model to obtain a second output vector based on the evaluation point time series, wherein (Continued)

each element of the second output vector is associated with a specific time; limiting the time determined by the first output vector depending on the second output vector in order to obtain the opening or closing time.

8 Claims, 3 Drawing Sheets

(56) References Cited

U.S. PATENT DOCUMENTS

| | | |
|---|---|---|
| 2013/0019842 A1 | 1/2013 | Shaver et al. |
| 2018/0179975 A1 | 6/2018 | Merlino et al. |
| 2021/0164414 A1* | 6/2021 | Oki ........................ F02D 41/20 |
| 2022/0292307 A1* | 9/2022 | Groh ................ G06F 18/24147 |
| 2023/0100963 A1* | 3/2023 | Neufeld ................ F02D 41/221 701/106 |
| 2023/0222345 A1* | 7/2023 | Groh ...................... G06N 3/044 706/15 |
| 2023/0228226 A1* | 7/2023 | Hopf .................. F02D 41/1405 701/106 |
| 2023/0229121 A1* | 7/2023 | Hopf ........................ G06N 3/08 700/29 |
| 2023/0313752 A1* | 10/2023 | Hopf ...................... G06N 20/00 700/282 |
| 2023/0340917 A1* | 10/2023 | Hopf .................. F02D 41/1405 |

FOREIGN PATENT DOCUMENTS

| | | |
|---|---|---|
| DE | 102007060049 A1 | 6/2009 |
| DE | 102012003581 B3 | 7/2013 |
| DE | 102018212669 A1 | 1/2020 |
| DE | 102019209690 A1 | 3/2020 |
| DE | 102019209644 A1 | 1/2021 |

* cited by examiner

METHOD AND DEVICE FOR OPERATING A FUEL INJECTION VALVE WITH THE AID OF MACHINE LEARNING METHODS

FIELD

The present invention relates to a method for operating a fuel injection valve of an internal combustion engine using data-based models, in particular for determining an opening time and/or a closing time or estimating an injected fuel quantity.

BACKGROUND INFORMATION

Electromechanical or piezoelectric injection valves are used for metering fuel in internal combustion engines. Said valves enable a direct and exactly measured supply of fuel into the cylinders of the internal combustion engine.

One challenge is to control the combustion process as precisely as possible in order to improve operating characteristics of the internal combustion engine, in particular in terms of fuel consumption, efficiency, pollutant emissions and smooth running. For this purpose, it is essential to operate the injection valves in such a way that the quantity of fuel to be injected can be metered with a high degree of repetition accuracy, at varying working pressures and, if necessary, with multiple injections per working cycle.

Injection valves can include an electromagnetic actuator or piezo actuator that actuate a valve needle to lift said valve needle from a needle seat and open an outlet opening of the injection valve to discharge the fuel into the combustion chamber. Because of structural differences and different operating conditions, such as temperature, fuel pressure and fuel viscosity, there is uncertainty when determining the exact opening time, i.e., the point in time from which fuel passes through the injection valve into the combustion chamber of the cylinder, and the exact closing time of the injection valve, i.e., the point in time up to which fuel passes through the injection valve into the combustion chamber of the cylinder.

SUMMARY

According to the present invention, a method for operating a fuel injection valve, a device, and an injection system are provided.

Example embodiments of the present invention are disclosed herein.

According to a first aspect of the present invention, a method for operating an injection valve by determining an opening or closing time of the injection valve based on a sensor signal comprising the following steps is provided:
  providing an evaluation point time series by sampling a sensor signal of a sensor of the injection valve;
  using a non-linear data-based first sub-model in order to obtain a first output vector based on the evaluation point time series, wherein each element of the first output vector is assigned to a specific time;
  using a linear data-based second sub-model in order to obtain a second output vector based on the evaluation point time series, wherein each element of the second output vector is assigned to a specific time;
  limiting the time determined by the first output vector depending on the second output vector in order to obtain the opening or closing time.

Even though an injection valve is activated according to a predefined activation signal profile, the resulting opening and closing movements of the injection valve vary, so that the actual opening and closing times for starting and ending the fuel injection cannot be exactly specified. The reason for this lies in the complex dependencies of the valve movement on the current operating point.

In order to monitor the valve movement, a piezo sensor configured as a pressure sensor is provided in the injection valves to detect the pressure changes of a fuel pressure triggered by the activation of the injection valve and to provide a corresponding sensor signal. The measured sensor signal can now be evaluated to determine the actual opening and closing times of the injection valve in order to adjust the activation of the injection valve accordingly.

The sensor signal is also noisy, however, and depends in particular on the actual fuel pressure in the fuel supply and the duration of the activation to be measured.

The evaluation of the sensor signal for determining an opening and/or closing time of the injection valve can be carried out with the aid of a data-based evaluation model. The data-based evaluation model can correspond to or comprise a probabilistic regression model, a neural network or a classification model.

The use of data-based evaluation models for determining an opening or closing time is advantageous because suitable modeling, in particular with the aid of a physically motivated model, cannot be mapped due to the numerous influences and interactions. In safety-critical applications, however, the use of purely data-based models is questionable, because there is no way to ensure, for every operating point, that the output of the evaluation model will not lead to undesired system behavior.

Therefore, according to an example embodiment of the method of the present invention, the evaluation model can be provided as a hybrid model that carries out a determination of the opening and/or closing time independently based on two data-based sub-models and combines the results of the sub-models with one another to obtain the opening and closing time. For this purpose, a first data-based sub-model is provided, which maps an evaluation point time series derived from a sensor signal of a piezo sensor in the injection valve to a model output that indicates an opening time and/or closing time. Thus, a respective opening and/or closing time is specified by each sub-model independently of one another.

The model output can be an output vector in the form of a logit. The output vectors of the two sub-models are respectively defined in such a way that the index of the elements of each output vector indicates a corresponding opening or closing time. For example, given a number of n evaluation points, the output vector can correspondingly comprise a number of n elements. The indices of the elements of the output vectors are assigned to successive points in time within a considered evaluation period. The times assigned to the elements of the output vector of the sub-models can in particular correspond to the temporally equally spaced evaluation times.

The index value of the element with the maximum element value in the output vector thus indicates the opening and closing time to be determined in the evaluation period. The sub-models can thus be configured to indicate the value of each element of the output vector according to a probability with which a time determined by an index value of the element corresponds to the opening and/or closing time to be output. The opening or closing time can in particular be determined by determining the index value of the element of the output vector with the correspondingly highest value and assigning the index value to a corresponding opening or closing time.

The assignment of the index value to a corresponding time is specified by the training of the sub-models and is in particular indicated in relation to a crankshaft angle or with reference to the start time of the activation of the injection valve by the activation signal for the actuator unit of the injection valve.

According to an example embodiment of the present invention, the results of the two sub-models are combined to obtain the actual opening or closing time. A trade-off between the reliability of the second sub-model and the accuracy of the first sub-model can thus be achieved.

The first data-based sub-model can be configured as a non-linear neural network. The non-linear neural network typically comprises multiple layers of neurons, at least one neuron of which has a non-linear activation function. The output layer is preferably provided without a non-linear activation function. This makes it possible to model even complex, non-linear relationships.

The second data-based sub-model can be configured as a linear neural network with preferably only one layer. The linear second sub-model has no non-linear activation function and thus differs from the non-linear first sub-model in that it is less complex. The second data-based sub-model can be provided as a linear model that assigns the evaluation point time series to a time in the same way as the first sub-model. The sub-models are preferably configured such that the formats of the output of the opening or closing time are identical.

In the linear neural network, the input vector is multiplied by a matrix and the result is provided as a model output. No activation functions, in particular no non-linear activation functions, are provided.

In particular in safety-critical applications, such as determining and monitoring the quantity of fuel to be injected for an injection valve, it is necessary that the function used to meter the fuel quantity be comprehensible. Since the first data-based sub-model corresponds to a non-linear neural network and thus a black box model, the functions for determining the output vector cannot be analyzed. The linear data-based second sub-model, on the other hand, represents a comprehensible mapping.

Since the first sub-model is configured as a purely data-based classification model, it can generally be trained, based on training data, in such a way that more precise information about the opening time or closing time can be determined. To avoid safety-critical, erroneous determinations of the opening time or the closing time, the determined time of the first sub-model is limited according to the model output of the second sub-model.

According to an example embodiment of the present invention, a deviation from the time determined by the second sub-model, for example, can be defined by a limitation range, wherein the time determined by the first sub-model is limited to the limitation range in order to output it as an opening or closing time.

Using the linear second sub-model makes it possible to explicitly comprehend the influence of the individual entries of the evaluation point time series. Unexpected model outputs can therefore not occur. This is in particular important for safety-critical applications in which the exclusive use of so-called black box models, in which the calculation sequences are not comprehensible, is not permissible.

The time determined by the first output vector can in particular be limited by limiting the first index value for the first output vector to an index value range that extends within a range defined by a predetermined tolerance threshold value around the second index value of the second output vector.

Alternatively, the index values determined from the first and second output vector can be assigned to the corresponding times, wherein, with the aid of a predetermined tolerance spacing, the time determined from the second sub-model is used to specify a limitation range which limits the time determined from the first sub-model to thus determine the opening or closing time.

According to a further aspect of the present invention, a device for carrying out one of the above methods is provided.

According to an example embodiment of the present invention, the first and second sub-models can alternatively be designed to output a respective opening and/or closing time directly. At least the first data-based sub-model can thus also be provided as a regression model to output the actual time, i.e., the opening or closing time, according to the training of the sub-models.

It can be provided that the operation of the injection valve is carried out depending on the opening and/or closing time, wherein the operation of the injection valve is in particular carried out such that an open duration of the injection valve determined via the ascertained opening and/or closing time is set to a predetermined target open duration.

According to a further aspect of the present invention, a method for training sub-models for a data-based evaluation model for determining an opening and/or closing time of an injection valve is provided. According to an example embodiment of the present invention, the method includes the following steps:
  providing training data sets, each of which specifies a specific opening and/or closing time for an evaluation point time series;
  training a first sub-model, which is configured as a non-linear data-based model, with the aid of the training data sets;
  training a second sub-model, which is configured as a linear data-based model, with the aid of the training data sets.

The sub-models can accordingly be trained from the specification of evaluation point time series with corresponding labels. In the case of regression models, the labels can correspond to the respective opening or closing times. In the case of a classification model, the labels can correspond to an output vector having a number of elements, wherein the index values of the elements are respectively assigned to a corresponding opening or closing time. For example, the output vector of the label can allocate a "0" to all of the elements and a "1" only to the element the index value of which can be assigned to the determined opening or closing time.

After training, when inferred using the respective sub-model, the value of the relevant element indicates a probability with which the assigned time corresponds to an opening or a closing time.

The linear function of the second sub-model corresponds to a data-based linear model that evaluates the evaluation point time series with the aid of a matrix multiplication, wherein, in contrast to the calculations in the first sub-model and due to the linearity of a matrix multiplication, the calculations in the linear model can be reproduced. This is in particular important for safety-critical applications for which the use of so-called black box models, in which the calculation sequences are not reproducible, is not permissible.

BRIEF DESCRIPTION OF THE DRAWINGS

Example embodiments of the present invention are explained in more detail in the following with reference to the figures.

DETAILED DESCRIPTION OF EXAMPLE EMBODIMENTS

Figure 1:
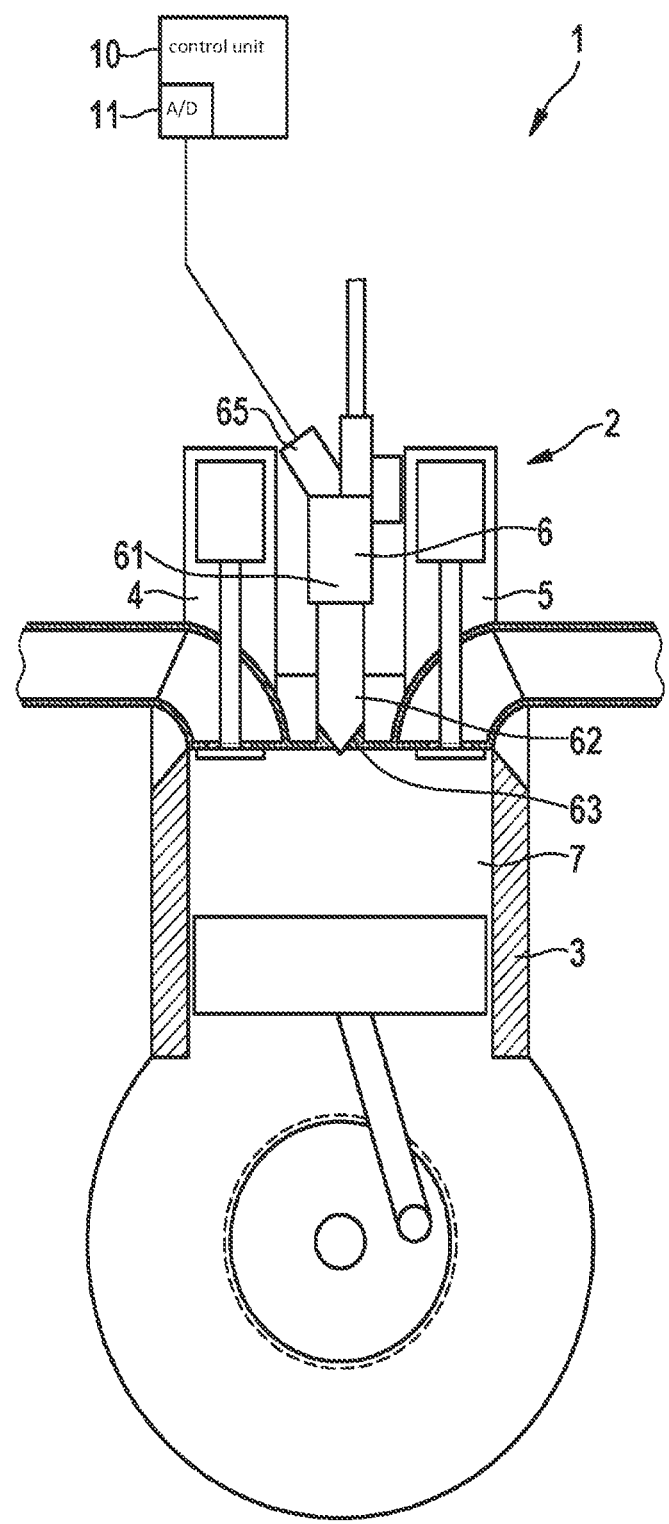
FIG. 1 shows a schematic illustration of an injection system for injecting fuel into the cylinder of an internal combustion engine, according to an example embodiment of the present invention.

FIG. 1 shows an arrangement of an injection system 1 for an internal combustion engine 2 of a motor vehicle, for which a cylinder 3 (of in particular a plurality of cylinders) is shown as an example. The internal combustion engine 2 is preferably configured as a diesel engine with direct injection, but can also be provided as a gasoline engine.

The cylinder 3 comprises an inlet valve 4 and an outlet valve 5 for supplying fresh air and for discharging combustion exhaust gas.

Fuel for operating internal combustion engine 2 is moreover injected into a combustion chamber 7 of cylinder 3 via an injection valve 6. For this purpose, fuel is supplied to the injection valve via a fuel supply line 8, via which fuel is made available under high fuel pressure in a conventional manner (e.g., common rail).

The injection valve 6 comprises an electromagnetically or piezoelectrically controllable actuator unit 61 which is coupled to a valve needle 62. In the closed state of the injection valve 6, the valve needle 62 is seated on a needle seat 63. Activation of the actuator unit 61 moves the valve needle 62 in longitudinal direction and uncovers part of a valve opening in the needle seat 63 in order to inject the pressurized fuel into the combustion chamber 7 of the cylinder 3.

The injection valve 6 further comprises a piezo sensor 65, which is disposed in the injection valve 6. The piezo sensor 65 is deformed by pressure changes in the fuel passing through the injection valve 6 and is generated as a sensor signal by a voltage signal.

The injection is controlled by a control unit 10 which specifies a quantity of fuel to be injected by energizing the actuator unit 61. The sensor signal is temporally sampled in the control unit 10 with the aid of an A/D converter 11, in particular at a sampling rate of 0.5 to 5 MHz.

During operation of the internal combustion engine 2, the sensor signal is used to determine a correct opening or closing time of the injection valve 6. For this purpose, the sensor signal is digitized into an evaluation point time series by means of the A/D converter 11 and evaluated by a suitable evaluation model, from which an open duration of the injection valve 6 and correspondingly an injected fuel quantity can be determined as a function of the fuel pressure and other operating variables. To determine the open duration, an opening time and a closing time are in particular needed to determine the open duration as the time difference of these variables.

The determination of an opening time and/or a closing time can be carried out based on the consideration of the sensor signal profile. The opening time and/or the closing time can in particular be determined with the aid of a data-based evaluation model.

Figure 2:
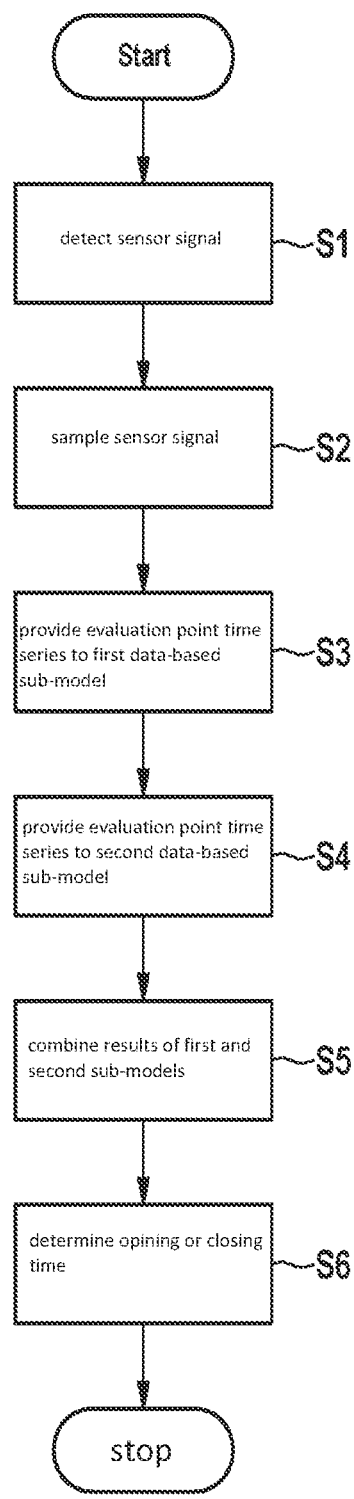
FIG. 2 shows a flow chart to illustrate a method for using a trained data-based evaluation model for determining an injected fuel quantity, according to an example embodiment of the present invention.

Using a flow chart, FIG. 2 illustrates a method for determining an opening and/or closing time of an injection valve 6 of a cylinder 3 in an engine system 1. The method is used to observe control functions for the internal combustion engine 2 and in particular to determine the injected fuel quantity.

Figure 3:
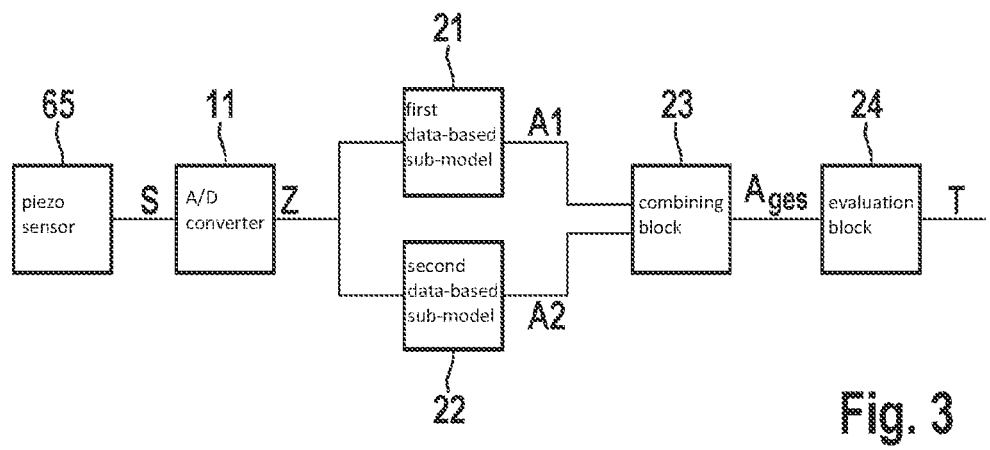
FIG. 3 shows a block diagram illustrating a method for determining an opening or closing time of an injection valve with the aid of a data-based evaluation model, according to an example embodiment of the present invention.

The method is described in more detail in connection with the block diagram of FIG. 3. The method is carried out in the control unit 10, in which it can be implemented in the form of software and/or hardware.

The method is described based on the consideration of an injection valve 6 for an individual cylinder 3 of internal combustion engine 2. The method can, of course, be used in parallel for all injection valves 6 of an internal combustion engine 3, i.e., also for multi-cylinder internal combustion engines.

In Step S1, a sensor signal is detected by means of the piezo sensor 65. This signal is typically a voltage signal, which is generated as a result of pressure changes in the supplied fuel.

In Step S2, the sensor signal is sampled with the aid of the A/D converter 11 to determine an evaluation point time series Z within an evaluation period. The evaluation period can be set with respect to an activation time window of the injection valve. The activation time window is defined by the start of the activation of the actuator unit 61 and an established period of time that specifies a maximum period of time in which the activation signal specifies a valve opening for the actuator unit 61. The activation time window thus includes a defined time reference, for which an evaluation point time series Z is provided that represents the basis for the further determination of an opening or closing time. The evaluation point time series can in particular be determined by downsampling the previously oversampled sensor signal.

Figure 4:
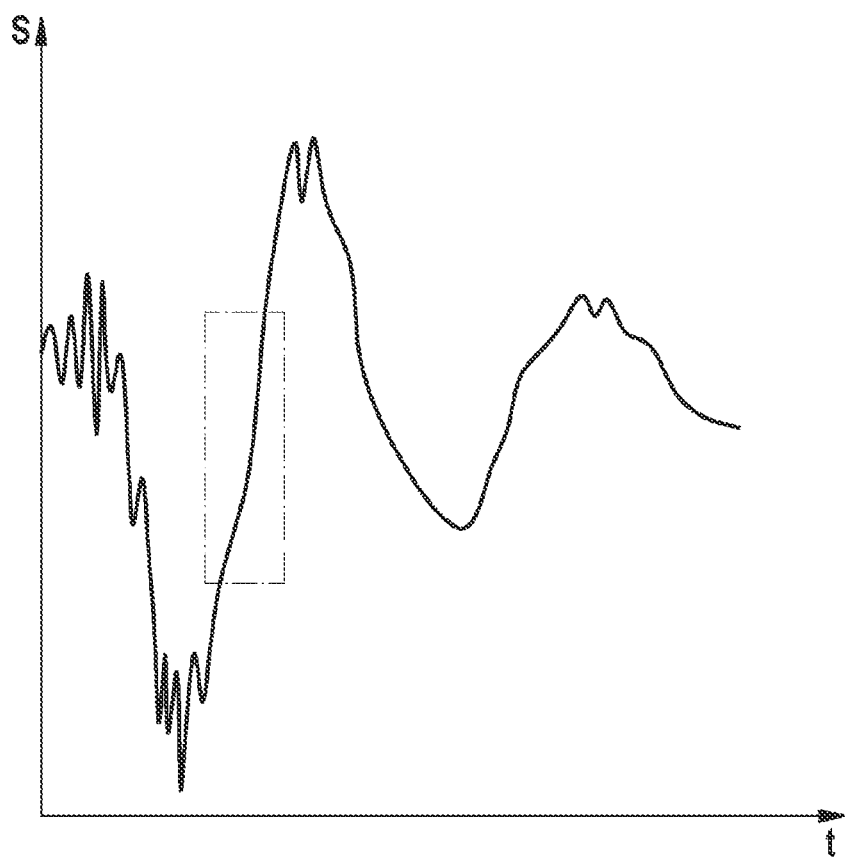
FIG. 4 shows a schematic illustration of an example of a temporal progression of an evaluation point time series, according to an example embodiment of the present invention.

The evaluation period can be provided with a fixed time reference to the working cycles of the internal combustion engine 2; the evaluation period can in particular start at a predetermined crankshaft position, preferably within the compression stroke. The evaluation period can be selected such that the entire open time window of the injection valve can be mapped therein. Such an evaluation period with an example of an evaluation point time series Z is shown in FIG. 4.

In Step S3, the evaluation point time series Z is provided to a first data-based sub-model 21. The first data-based sub-model 21 can be a trained neural network with multiple layers or the like. At least one layer comprises one or more neurons that contain an activation function, in particular a non-linear activation function. The output layer that provides the model output is provided without an activation function.

The first sub-model 21 provides a logit as the first output vector A1. The first output vector A1 includes a number of elements that are each assigned to a possible opening or closing time. The possible opening or closing times are preferably assigned according to the increasing index value of the elements.

In a Step S4, the evaluation point time series Z is provided to the second sub-model 22. The second sub-model 22 can be trained on the training data as a linear data-based model. The second data-based sub-model 22 can be configured as a linear neural network with preferably only one layer. In the linear neural network, the input vector is multiplied by a matrix and the result is provided as a model output. No activation functions, in particular no non-linear activation functions, are provided. Using the linear sub-model makes it possible to explicitly comprehend the influence of the individual entries of the evaluation point time series Z.

The second sub-model 22 can thus also be used in safety-critical fields, because it is comprehensible and unexpected model outputs can be ruled out.

The result of the evaluation of the evaluation point time series Z in the second sub-model 22 has the same format as that of the first sub-model 21, namely a second output vector A2 from which a second opening or closing time can be determined in the above-described manner.

The first sub-model 11 and the second sub-model 22 are trained with the aid of training data sets that each include an evaluation point time series Z and an associated output vector. The output vector encodes the to-be-trained opening and/or closing time, which was previously determined by measuring the injection valve on a test stand, so that only the element the index value of which corresponds to the to-be-trained opening and/or closing time is assigned a high value, in particular a "1", while the other elements are assigned a low value, in particular a "0".

In Step S5, the results of the sub-models, i.e., the first output vector A1 and the second output vector A2, are combined together in a combining block 23. For this purpose, the output vectors A1, A2 are analyzed separately with regard to the opening or closing time to be determined. For both sub-models (21, 22), this is done by determining the index value of the element with the highest value using an arg max function, wherein the thus determined index value is assigned to an opening or closing time.

With the aid of a predetermined tolerance spacing, which can be predetermined as an integer tolerance spacing, the index value determined by means of the second sub-model forms a limitation range around the index value correspondingly determined by the second sub-model 22. The limitation range limits the output of the first sub-model 21 by limiting the index value determined from the first sub-model to the limitation range.

In other words, if both index values are the same, the index value is used as the value that determines the opening or closing time. If the index value determined from the first output vector A1 is within the limitation range around the index value determined by the second output vector A2, the index value determined by the first output vector A1 is used. If the index value determined from the first output vector A1 is not within the limitation range around the index value determined by the second output vector A2, the index value determined by the first output vector A1 is limited to the index value determined by the second output vector A2.

In Step S6, the to-be-ascertained opening or closing time is determined in an evaluation block 24 by determining the correspondingly assigned time as the opening or closing time from the limited index value. The assignment corresponds to a predetermined time grid for the output vector of the two sub-models.

Alternatively, the index values determined from the first and second output vectors A1, A2 can also be assigned to the respective times prior to the limitation. With the aid of a predetermined tolerance spacing, the time determined from the second sub-model is used to specify a limitation range which limits the time determined from the first sub-model to thus determine the opening or closing time.

What is claimed is:

1. A device configured to operate an injection valve by determining an opening or closing time of the injection valve based on a sensor signal, the device configured to:
   provide an evaluation point time series by sampling a sensor signal of a sensor of the injection valve;
   use a non-linear data-based first sub-model to obtain a first output vector based on the evaluation point time series, wherein each element of the first output vector is assigned to a specific time;
   use a linear data-based second sub-model to obtain a second output vector based on the evaluation point time series, wherein each element of the second output vector is assigned to a specific time; and
   limit a time determined by the first output vector depending on the second output vector to obtain the opening or closing time, wherein the first and second sub-models are configured to respectively indicate a value of each element of the first and second output vector, respectively, according to a probability with which a time determined by an index value of the element corresponds to the opening or closing time to be output.

2. A method for operating an injection valve by determining an opening or closing time of the injection valve based on a sensor signal, comprising the following steps:
   providing an evaluation point time series by sampling a sensor signal of a sensor of the injection valve;
   using a non-linear data-based first sub-model to obtain a first output vector based on the evaluation point time series, wherein each element of the first output vector is assigned to a specific time;
   using a linear data-based second sub-model to obtain a second output vector based on the evaluation point time series, wherein each element of the second output vector is assigned to a specific time; and
   limiting a time determined by the first output vector depending on the second output vector to obtain the opening or closing time, wherein the first and second sub-models are configured to respectively indicate a value of each element of the first and second output vector, respectively, according to a probability with which a time determined by an index value of the element corresponds to the opening or closing time to be output.

3. The method according to claim 2, wherein the first and the second output vector each comprise a number of elements, first and second index values of which indicate determinate times for the opening or closing time, wherein successive index values correspond to successive opening or closing times with temporally equal or variable spacing and identical first and second index values correspond to the same opening or closing time.

4. The method according to claim 3, wherein the opening or closing time determined by the first output vector is limited by limiting the first index value for the first output vector to an index value range that extends within a range defined by a predetermined tolerance threshold value around the second index value.

5. The method according to claim 2, wherein the index values determined from the first and second output vector are assigned to corresponding times, wherein, using a predetermined tolerance spacing, the time determined from the second sub-model is used to specify a limitation range which limits the time determined from the first sub-model to thus determine the opening or closing time.

6. A method for operating an injection valve by determining an opening or closing time of the injection valve based on a sensor signal, comprising the following steps:
   providing an evaluation point time series by sampling a sensor signal of a sensor of the injection valve;
   using a non-linear data-based first sub-model to obtain a first output vector based on the evaluation point time series, wherein each element of the first output vector is assigned to a specific time;
   using a linear data-based second sub-model to obtain a second output vector based on the evaluation point time series, wherein each element of the second output vector is assigned to a specific time; and
   limiting a time determined by the first output vector depending on the second output vector to obtain the opening or closing time, wherein the first sub-model is configured as a non-linear neural network and the second sub-model is configured as a linear neural network.

7. A method for operating an injection valve by determining an opening or closing time of the injection valve based on a sensor signal, comprising the following steps:
   providing an evaluation point time series by sampling a sensor signal of a sensor of the injection valve;
   using a non-linear data-based first sub-model to obtain a first output vector based on the evaluation point time series, wherein each element of the first output vector is assigned to a specific time;
   using a linear data-based second sub-model to obtain a second output vector based on the evaluation point time series, wherein each element of the second output vector is assigned to a specific time; and
   limiting a time determined by the first output vector depending on the second output vector to obtain the opening or closing time, wherein the operation of the injection valve is carried out depending on the opening and/or closing time, wherein the operation of the injection valve is carried out such that an open duration of the injection valve determined via the determined opening and/or closing time is set to a predetermined target open duration.

8. A machine-readable storage medium on which is stored a computer program including instructions for operating an injection valve by determining an opening or closing time of the injection valve based on a sensor signal, the instructions, when executed by a computer, causing the computer to perform the following steps:
   providing an evaluation point time series by sampling a sensor signal of a sensor of the injection valve;
   using a non-linear data-based first sub-model to obtain a first output vector based on the evaluation point time series, wherein each element of the first output vector is assigned to a specific time;
   using a linear data-based second sub-model to obtain a second output vector based on the evaluation point time series, wherein each element of the second output vector is assigned to a specific time; and
   limiting a time determined by the first output vector depending on the second output vector to obtain the opening or closing time, wherein the first and second sub-models are configured to respectively indicate a value of each element of the first and second output vector, respectively, according to a probability with which a time determined by an index value of the element corresponds to the opening or closing time to be output.

\* \* \* \* \*